United States Patent [19]

Loran

[11] Patent Number: 5,321,909
[45] Date of Patent: Jun. 21, 1994

[54] PLANT AND TREE CONTAINER SUPPORT FOR PROTECTING SUBSTRATA

[76] Inventor: Carol J. Loran, 38478 Boulder Canyon Dr., Boulder, Colo. 80302

[21] Appl. No.: 103,339

[22] Filed: Aug. 6, 1993

[51] Int. Cl.⁵ .............................. A01G 9/04
[52] U.S. Cl. .......................... 47/71; 47/39; 47/66
[58] Field of Search ............ 47/39 P, 71, 66

[56] References Cited

U.S. PATENT DOCUMENTS

| | | | |
|---|---|---|---|
| 3,262,665 | 7/1966 | Black | 47/39 P |
| 4,454,681 | 1/1984 | White | 47/39 P |
| 4,833,823 | 5/1989 | Edwards | 47/39 P |
| 5,180,552 | 1/1993 | Saceman | 47/71 |
| 5,209,013 | 5/1993 | Sellers | 47/39 P |

FOREIGN PATENT DOCUMENTS 131644  8/1932  Austria ................... 47/39 P

Primary Examiner—Henry E. Raduazo
Attorney, Agent, or Firm—Thomas J. Loran

[57] ABSTRACT

A support device for plant and flower containers that distributes the weight of the container on substrata using a plurality of support members while providing air circulation between the container and substrata to deter compression of substrata and formation of mildew, mold and fungus on the substrata.

6 Claims, 1 Drawing Sheet

PLANT AND TREE CONTAINER SUPPORT FOR PROTECTING SUBSTRATA

BACKGROUND OF THE INVENTION

1. Field of the Invention

The present invention relates generally to supporting containers of mobile plants, flowers and trees, and more particularly to retarding and reducing damage to carpet, rug, mat, and floor substrata due to compressive loads and formation of moisture, fungus or mildew on substrata under the plant or tree containers.

2. Description of the Prior Art

It is well known that many types of containers for holding various flowers, plants, and trees are used when desiring mobility of these decorative and functional growths from their natural growing places. When plants flowers and trees are removed from their natural habitat for decorative, functional or growing purposes, soil and moisture must be maintained around the roots. Various mobile containers of numerous designs are employed to accomplish preservation of the species. These devices are designed to hold and contain the plant and tree roots, soil, and moisture while the plants or trees grow or are used for esthetic display in homes or buildings. Many artificial plants and trees also use root containers to simulate growth and display the natural state.

Plant and tree containers of various shapes such as round, oval and rectangles are common. Some mobile containers with holes for root expansion, legs, wheels, circular supports have been used for many years. Plant containers have been designed to be supported from walls and ceilings or overhangs to achieve desired results of presentation. This type of suspended support removes problems that containers placed on floor, shelf or window sill levels relating to weight distribution and formation of moisture or mildew on floors, floor coverings, or other substrata supports. However, in many instances, wall or ceiling supports are not practical or desired. Some plant stands elevate the plant containers from substrata or floors providing esthetic display and ornamental features. But these elevated designs may provide problems by exerting compressive force from their few support surfaces residing on substrata.

The weight of plant containers when placed on carpets or resilient floor surfaces causes compression and distortion of these substrata. In many cases the container compressive force transfers to carpets or rugs and then to their under pads and compresses these functional and protective coverings beyond recovery after removal of the container. If four or less supports are used under elevated containers, the weight is concentrated into these contacting areas forcing more compression of carpets and rugs. Containers having wheels that are round or cylindrical shaped have only four point contacts or narrow line contacts that depress on substrata surfaces large loads per area of contact. Containers having flat bottoms readily cause imprints on the carpet and rug surfaces and promote additional problems as discussed below on the substrata. Trivets having three long bar shaped legs contacting the substrata have been available. However, these triangular planar arrangements compress and deform the substrata under the bar supports and also fail structurally by not supporting the central part of the triangular stand.

The commonly used flat bottom moisture trays placed under plant containers distribute the weight over the entire container tray area but do not allow any air flow to the substrata. These trays duplicate many standard pots or containers by compressing the fibers and limiting air flow between the container bottoms and substrata. This promotes attack by mold, mildew and residual moisture to substrata materials.

Live plants and trees in containers need periodic watering for survival. Moisture in ceramic type containers may seep through container wall pores to the outer container surface. Also, moisture from the air condenses on the container outer surface that may be normally cooler than the environment due to water evaporation from the open top of the plant container. If ceramic or plastic trays are used under the container to collect excess water from the container, moisture may accumulate under the bottom of the tray and on the substrata. This promotes destructive mildew, fungus, and/or mold formation on carpets, floors, and surfaces under the plant container.

Deterioration of substrata under plant containers is normally not evident to users, owners, or installers until the damage has progressed to a destructive stage. Only until the substrata under carpets or pads are exposed or carefully examined will the damage show. Many home or business owners using plant containers observe compression on the surface of their floor coverings and do not realize that mold and mildew are forming under the floor coverings due to lack of air circulation under compressive loads. Plant and flower sales people or gardeners skilled in this business are not apprised of the mildew type problems because time is a factor for this to occur and the damage usually is not readily visible. After the damage occurs, the sales people in this business are not responsible.

SUMMARY OF THE INVENTION

The present invention consists of having or using a support device comprising a surface member having a multiplicity of supporting members exceeding four in number attached under the surface member for separating plant, flower or tree mobile containers from substrata. This inventive device is placed under live, artificial, or preserved plant, flower, or tree containers. Each of the plurality of supporting members has narrow or minimum area dimensions that distributes the container weight over numerous small areas thereby providing minimum compression areas of carpet, rug, mat, or any substrata surface. The height of these multiple supporting members from the surface member to the substrata surface and their distributed positions under the surface member allow free flow of air between the container and substrata to prevent mildew, fungus, or mold formation on container bottoms or substrata formations. The purpose is not to provide higher profiles for plants similar to cited art but primarily to elevate plant containers sufficiently to provide air flow between the plant container and substrata while distributing the container weight over a plurality of supporting members.

Accordingly, an object of the invention is preventing or retarding mildew or mold formation on bottom surfaces of plant and tree containers or container moisture trays and contacting substrata support surfaces by allowing air flow between these surfaces.

Another object of the present invention is reducing concentrated weight loads from live, preserved, or artificial plant, flower or tree containers from deforming substrata such as carpets, rugs, mats, plastic, or wood finished surfaces.

Another object of the invention is to prevent moisture forming on bottoms of plant containers or trays that causes discoloration or deterioration of substrata surfaces.

A further object of the invention is guiding the plant container to remain on the support surface when rotating plant containers on the invention surface without harming or disturbing the substrata.

BRIEF DESCRIPTION OF THE DRAWING

The foregoing and other objects, features, and advantages of the invention will be apparent from the following description of the preferred embodiments of the invention as illustrated in the accompanying drawings.

DETAILED DESCRIPTION OF PREFERRED EMBODIMENTS

Figure 1:
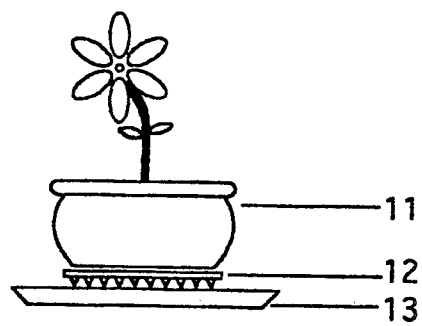
FIG. 1 is a view of the plant, plant container, the plant support invention and substrata protected by the invention from compressive forces and fungus, mildew, and mold growth.
Figure 5:
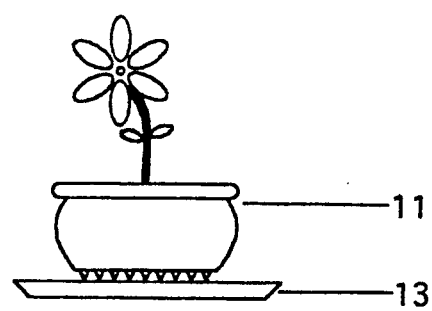
FIG. 5 is a view of the plant container having the support members integral with the container.
Figure 2:
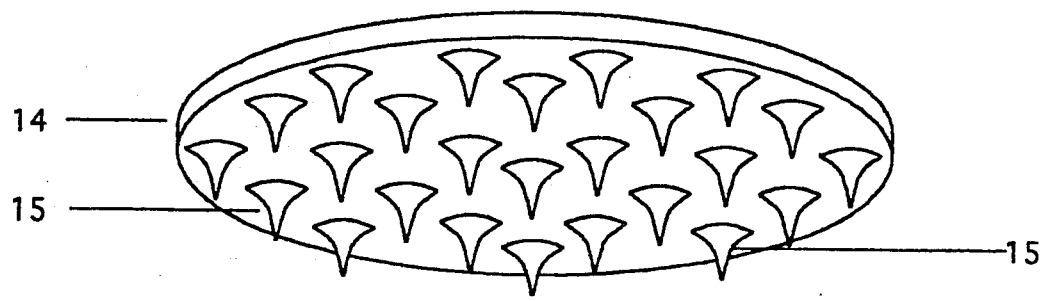
FIG. 2 is a perspective view of one form of the plant and flower inventive device indicating the surface member and support members.

According to the present invention a device is provided for supporting mobile plant, flower, and tree containers while protecting substrata such as carpets, mats, floors, rugs, shelves and window sills against compressive loads and mildew or mold formation. Referring to FIG. 1, the inventive support device 12 is positioned between the plant container 11 and substrata surface 13. To distribute the compressive loads produced by the weight of the containers holding plants or trees the invention uses a plurality of more than four support members attached to the bottom of a surface member providing a multiplicity of support cites under the container. Referring to FIG. 2, the support members 15 are distributed under the surface member 14 for support. The location of these support members is appropriately distributed throughout the bottom of the surface member to equalize the plant container compressive load through the numerous support members. The cross-sectional area of each support member contacting the substrata is kept minimum to prevent compression of substrata materials but sufficiently large to prevent failure of the supporting member. The cross-sectional area contacting the substrata could be a point contact for smaller containers. Each support member may be tapered from a larger cross-sectional area near the support surface to a smaller cross-sectional area contacting the substrata to lessen compression areas on substrata and allow air flow between support members.

The height of the plurality of support members is sufficient to allow air flow between the substrata and the surface member. For long fiber carpets, this distance could exceed one inch. For smooth surfaces, the length could be less than one-eighth inch. The separation distance between the support members must be sufficient to allow air to freely flow between these members. The distribution of load to many small areas on the substrata lessens any compressive force to minute and numerous small areas where moisture cannot accumulate. This results in a low profile device that need not be decorative for some applications.

Figure 3:
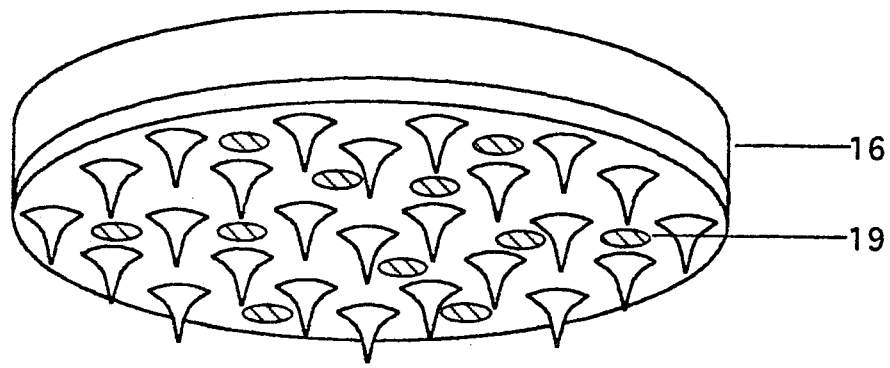
FIG. 3 is a perspective view of one form of the inventive device having a lip for guiding the plant container when rotating the container.

The size and shape of the surface member having the plurality of support members relates to the size and shape of the containers. Naturally, large tree containers require large dimensional surface members with many support members while small potted plants require smaller surfaces and fewer support members. The surface member may have a peripheral lip in direction opposed to support members to hold a container and allow guided rotation of the container on the support during plant growth while maintaining a stable position on the substrata. This is shown in FIG. 3 where 16 indicates the peripheral lip. The surface member may also be an integral part of any moisture tray or a container itself instead of being a separate support. The surface member may contain openings in the surface 19 to promote air flow to the container or any other purpose.

Figure 4:
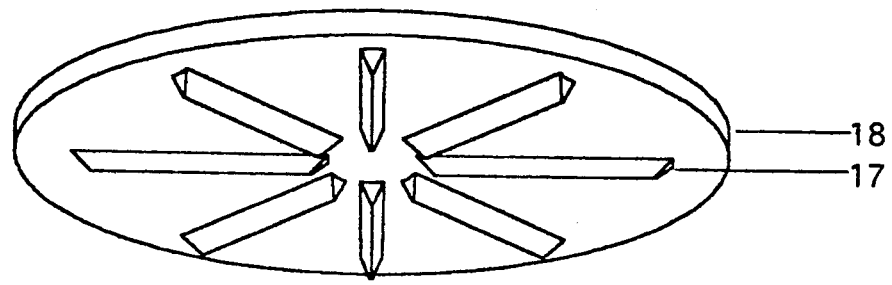
FIG. 4 is a perspective view of the support device for mobile plant containers having support members in the form of linear, radial positioned support members on a round inventive surface member.

The support members could be integrally adjoined to form a linear contact surface on the substrata. These linear supports could be various lengths and positioned in multiplicity under the surface member. These linear supports could have radial or linear positions that distribute the plant container weight and allow air flow between the positioned supports. FIG. 4 indicates this design with a round surface member 16 and linear support members 17 in radial positions.

In this discussion, a container for plants, flowers, and trees includes but is not limited to a container for all artificial, live or formerly live cactus, ivies, vines, shrubs, grass, weeds, orchids, trees, flowers, plants, vegetables, and fruits.

Materials of construction for the support may include but not be limited to thermoplastics or thermosetting plastics, metals, wood, glass, ceramics, clay or combinations of these materials.

In operation, the method of preventing compression of substrata and growth of molds and fungus under portable plant containers is accomplished by dividing the plant container load into many supporting members having minimum contact areas on a substrata while maintaining air flow between the container and substrata. This is effected by a low profile device fitted between the plant container and substrata.

While several specific preferred embodiments of the present invention have been shown, it will be apparent to those skilled in the art that numerous changes and modifications may be made within the scope of the invention and that such changes may be made without departing from the spirit and scope of the invention as defined by the following claims.

I claim:

1. A support device for a mobile plant container comprising:
   (a) a surface member,
   (b) a plurality of support members attached to bottom of said surface member providing a multiplicity of support sites on a substrata,
   (c) each said support member having a cross-sectional area providing a wedge shape support to said surface member and linear contact length on said substrata, (d) said support members having a height and distribution allowing air flow between said substrata and said surface member.

2. The invention as recited in claim 1 wherein said surface member contains openings.

3. The invention as recited in claim 1 wherein said linear support members being radial positioned under said substrata.

4. The invention as recited in claim 1 wherein said surface member is integral with said plant container and said support members are integral with said surface member.

5. The invention as recited in claim 1 wherein said surface member comprises a saucer for said plant container and said support members are integral with said saucer.

6. The invention as recited in claim 1 wherein said support device being constructed of materials selected from the group consisting of wood, plastic, glass, ceramic, clay and metals.

* * * * *